RADIOBROADCASTING SYSTEM

Filed Feb. 26, 1945 5 Sheets-Sheet 1

INVENTORS
EMILE LABIN
DONALD D. GRIEG
BY Percy P. Lantzy
ATTORNEY

May 30, 1950 E. LABIN ET AL 2,509,237

RADIOBROADCASTING SYSTEM

Filed Feb. 26, 1945 5 Sheets-Sheet 2

INVENTORS
EMILE LABIN
DONALD D. GRIEG

BY Percy P. Lantzy

ATTORNEY

INVENTORS
EMILE LABIN
DONALD D. GRIEG
BY Percy P. Lantzy
ATTORNEY

INVENTORS
EMILE LABIN
DONALD D. GRIEG
BY *Percy P. Lantzy*
ATTORNEY

INVENTORS
EMILE LABIN
DONALD D. GRIEG
BY Percy P. Lantzy
ATTORNEY

Patented May 30, 1950

2,509,237

UNITED STATES PATENT OFFICE 2,509,237

RADIOBROADCASTING SYSTEM

Emile Labin, New York, and Donald D. Grieg, Forest Hills, N. Y., assignors to Federal Telephone and Radio Corporation, New York, N. Y., a corporation of Delaware Application February 26, 1945, Serial No. 579,724

5 Claims. (Cl. 250—15)

This invention relates to radio broadcasting systems and more particularly to radio multichannel systems in the ultra high frequencies and the selective reception of channels transmitted on the same carrier frequency.

An object of the invention is to provide a plurality of signalling or broadcasting transmitters located at different points in a metropolitan or other area to be served for simultaneous operation on the same or substantially the same carrier frequency without objectionable interference between the signals of the different transmitters.

Another object of the invention is to provide a transmitter-receiver combination for receiving signals on a given carrier frequency and for transmitting, substantially simultaneously, signals on the same carrier frequency.

Still another object of the invention is to provide a transmitter-receiver combination for receiving a signal modulated carrier and to transmit on the same carrier, energy pulse signals phased with respect to the timing of a given channel of signal pulses received on such carrier.

In accordance with the principles of our invention this multiple broadcasting of signal channels on a given carrier frequency from different transmitting points within a metropolitan area is performed by taking advantage of the ultra high frequencies. It is not necessary to have broadcasting stations of long range for metropolitan areas, since the service area is comparatively small. By operating in the ultra high frequencies a suitable range by line-of-sight of from 30 to 40 miles more or less is obtainable. While a plurality of radio channels may be transmitted simultaneously from a given transmitting point on a given carrier frequency, such as disclosed in our copending application, Serial No. 529,932, filed April 7, 1944, now Patent No. 2,485,611 issued October 25, 1949, assigned to Federal Telephone and Radio Corporation, the present invention provides for the simultaneous transmission on the same carrier frequency from a plurality of independent transmitting points.

In order to synchronize the signals transmitted on the same carrier frequency from the different points, one transmitter is used as the master station and the other transmitters are provided with receiving means for receiving signals from the master station, which are used to control the phasing of the signals transmitted at such other transmitters with respect to the signals received from the master station. Each transmitter station is assigned a predetermined phasing relation with respect to the signal pulses of the master station so that for the area served, the signals will not overlap and thereby interfere with the signals of the other transmitters. The relative location of the different transmitting points will control the phasing required as well as the extent of the area served. The pulses of each radio channel will have an average recurrence rate of 10,000 to 12,000 pulses per second the exact rate depending on the highest audio frequency to be transmitted, the pulses being of a width ranging from a fraction of one microsecond to two or more microseconds as may be desired. While amplitude modulation of the pulses may be employed under some circumstances for transmission of intelligence, we preferably employ time modulation, the maximum time displacement of pulses being preferably limited to less than one microsecond. It will be clear therefore, that the unoccupied time interval between the successive pulses of a given channel is approximately 80 microseconds, thereby providing ample time interval for the interleave phasing of a plurality of other channels for a metropolitan area.

Another important feature of the receiving and transmitting principles of the invention is the provision of means for obtaining the frequency component of the signals received from the master station for use as the carrier frequency of the signals transmitted by a subordinate transmitter station. The portions of the carrier wave representing the pulses of the master signal channel are segregated from the carrier wave in accordance with the width characteristic thereof, whereby the carrier frequency employed at the master station is obtainable independently of any carrier frequency variations present in the other radio channels of the carrier received. This insures a more exact alignment of the radio channels transmitted at the different transmitting points on a designated carrier frequency.

For a better understanding of the objects and features of this invention, reference may be had to the following detailed description to be considered in connection with the accompanying drawings in which.

Figure 1:
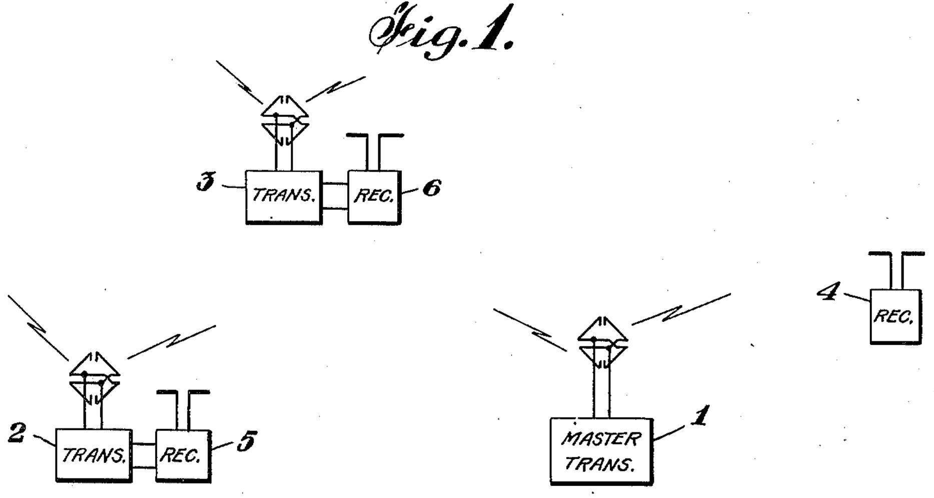
Fig. 1 is a diagrammatic illustration of a plurality of broadcasting stations located at different transmitting points and a receiver for selective reception, according to the principles of our invention.

Referring to Fig. 1, a plurality of transmitters 1, 2 and 3, for example, are shown for broadcasting on a common carrier frequency from different points within an area such as a metropolitan area of a city, and a receiver 4 that may be located in such area. The transmitter 1 is referred to as a master transmitter since according to our invention the signals thereof are used for synchronizing the transmitters 2 and 3. The transmitters 2 and 3 are provided with a receiver 5 and 6 respectively for receiving the signals from transmitter 1 and for controlling the transmission of the associated transmitter. The receivers 4, 5 and 6 may be identical insofar as the receiving circuits are concerned. The receivers 5 and 6, however, are provided with connections for use with circuits of the associated transmitter as will become clear from the following descriptions of Figs. 2 and 6.

Figure 2:
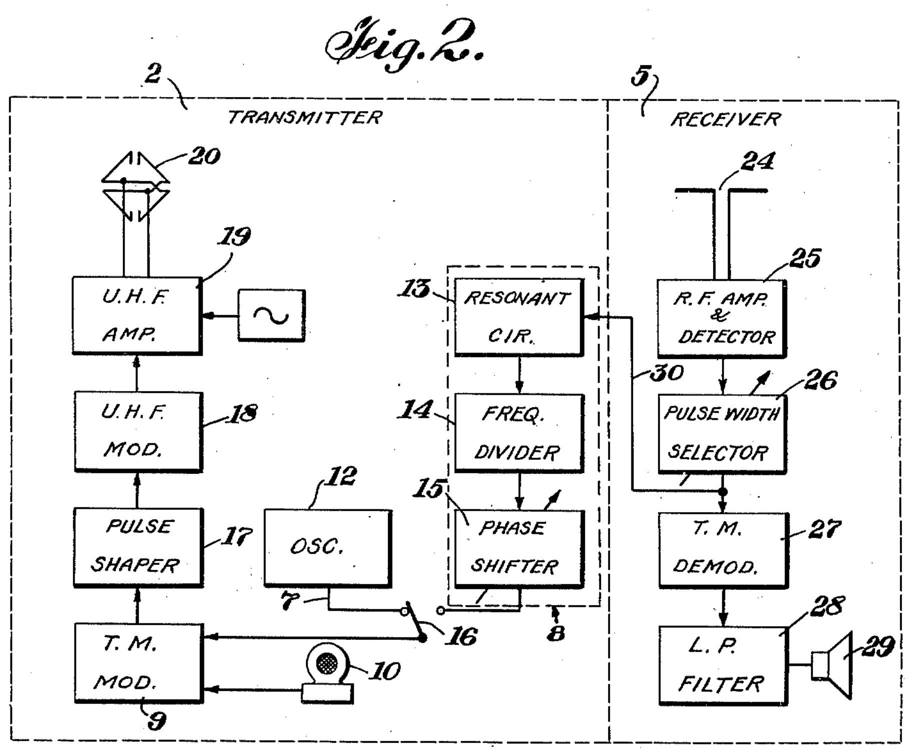
Fig. 2 is a block diagram of a transmitter-receiver combination of the invention.

In Fig. 2 a transmitter-receiver combination 2, 5 is shown. The transmitter is provided with two sources 7 and 8 of the base wave required in connection with the signal pulse modulator 9 which may be of any suitable character for producing pulses modulated in some characteristic such as amplitude or time (the latter being preferred) of the audio signals from microphone 10. The source 7 may comprise a known form of stable oscillator 12 for supplying a 6 kc. wave, for example. The source 8 comprises a resonant circuit 13, a frequency divider 14 and a phase shifter 15 arranged to provide the desired base wave from pulse energy received from receiver 5. The detailed operation of the base wave source 8 will be described hereinafter. For the present, it may be assumed that the modulator 9 receives its base wave from the oscillator 12 as indicated by the position of contact 16.

The pulse output of modulator 9 is applied to a pulse shaper 17 for shaping and determining the width of signal pulses. The pulse output of shaper 17 is applied to a U. H. F. modulator 18, the output of which is applied to a U. H. F. amplifier 19 in known manner for modulation of a carrier frequency. The pulse signal modulated carrier frequency output of amplifier 19 is applied to an antenna 20 of the omni-directional or semi-directional type for broadcasting purposes.

Figure 3:
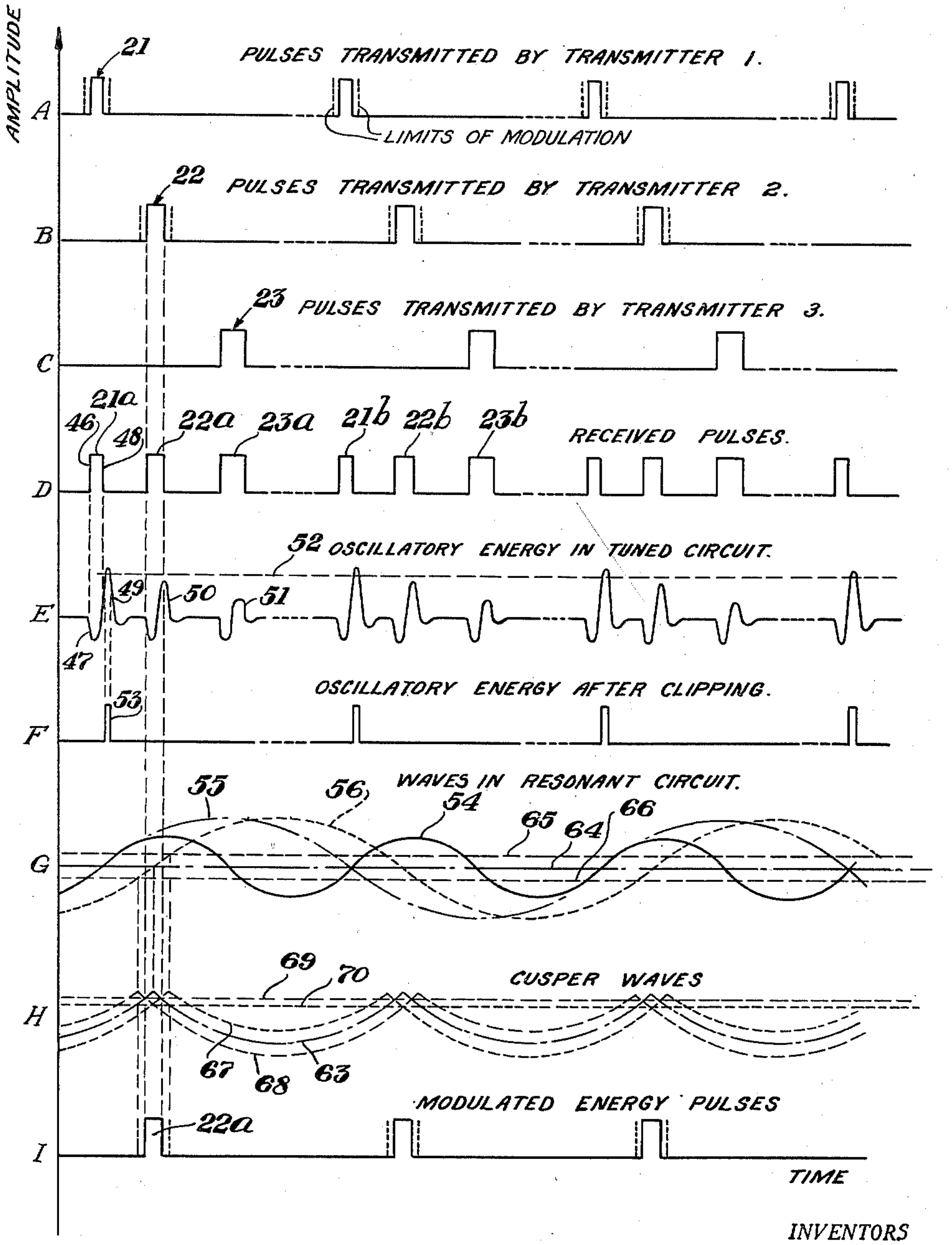
Fig. 3 is a graphical illustration useful in explaining the operation of the transmitter-receiver combination of Fig. 2.

In the graphs A, B and C of Fig. 3, we show three trains of signal pulses 21, 22 and 23 which represent the channels of signal pulses transmitted by transmitters 1, 2 and 3 respectively. Graph D shows the signal pulses of graphs A, B and C interleaved in a time relationship such as might be expected to occur at one of the receivers 4, 5 or 6. The signal pulses of the different radio channels are shown to be of different pulse widths so that any one channel may be selectively received by a suitable pulse width discriminator to the exclusion of the pulses of the other channels.

Let it be assumed that the carrier wave, containing the signal pulses of graph D, is received by the antenna 24 of receiver 5. The carrier wave will be suitably amplified and detected at 25 by either a broad band detector receiver circuit or by a heterodyne receiver, as may be desired. Regardless of the type of detection employed, the detected signal pulses, such as shown in graph D, are applied to a pulse width selector 26 whereby the pulses of a given width may be selected to the exclusion of pulses of other widths. Any suitable width selector circuit may be employed for this purpose, but as hereinafter described in connection with Fig. 4, we preferably employ a width selector circuit disclosed in our copending application, Serial No. 487,072, filed May 15, 1943, now Patent No. 2,440,278, issued April 27, 1948, which is assigned to Federal Telephone and Radio Corporation. The operation of the circuit will be described hereinafter, it being understood that the width selector will pass pulse energy corresponding to pulses of a given width only.

The channel of pulses selected at 26 is applied to T. M. (time modulation) demodulator 27, which may be of any known character capable of translating the time displacement of pulses into amplitude displacements which, when passed through a low pass filter 28, may be applied to speaker 29 or other utilization apparatus. The pulse energy passed by the selector 26 in addition to application to demodulator 27 may be applied over a connection 30 to the resonant circuit 13 for production of the base wave employed by the modulator 9.

Figure 4:
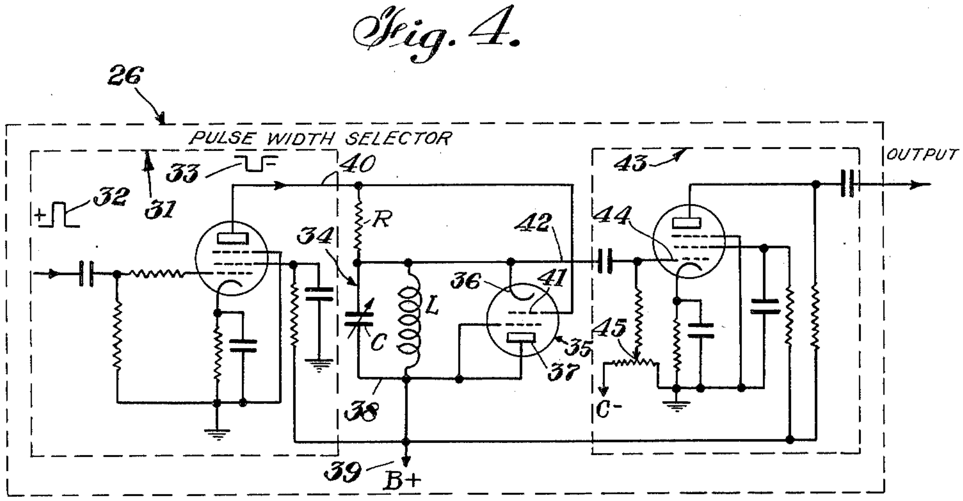
Fig. 4 is a schematic circuit diagram of a pulse width selector circuit.

Before proceeding with description of the operation of the transmitter-receiver combination 2, 5, reference is now made to the detailed circuit diagram of the selector 26 in Fig. 4. The pulse width selector 26 includes a limit clipping stage 31 as an input coupler which limits all input pulses to substantially the same amplitude. Should the input pulses be of a positive polarity as indicated at 32, the coupler stage 31 also serves to reverse the polarity as indicated at 33. The output pulse energy 33 is applied through a resistor R to a shock excitable L–C circuit 34. Connected across the tunable circuit 34 is a vacuum tube 35, the cathode 36 of which is connected to the input side of the circuit 34, while the anode 37 is connected to the opposite side 38 of the tunable circuit. The side 38 is also connected to a source of anode potential 39. The pulse energy 33 from the anode connection 40 is applied to the grid 41 of the tube 35 so as to block the conduction between the cathode 36 and the anode 37 while pulse energy is applied to the circuit 34. The undulations produced in the circuit 34 in response to pulse energy over anode connection 40 are taken off through a connection 42 for application to a threshold clipping amplifier stage 43. The bias on the grid 44 is controlled by adjustment of resistor 45.

Graph E of Fig. 3 illustrates the oscillatory energy set up in the tuned circuit 34, Fig. 4, in response to the pulses of graph D. The leading edge 46 of pulse 21*a*, for example, shock excites the tuned circuit 34 to produce an undulation 47 which according to the tuning of the circuit may be selected to correspond in duration to the width of pulse 21*a*. Such tuning of the circuit 34 causes the selector 26 to pass pulse energy corresponding to the pulses of channel 21. This is accomplished by the fact that the trailing edge 48 of pulse 21*a* occurs at the instant that the oscillatory energy represented by undulation 47 has just reached zero so that the shock excitation produced by the trailing edge 48 adds to this oscillatory energy, thereby resulting in an undulation 49 of polarity opposite the polarity of undulation 47. The damping tube 35 eliminates substantially the oscillatory energy produced by the pulse 21a following the undulation 49.

For pulses of width differing from pulse 21a, such for example, as indicated by pulses 22a and 23a, it will be clear that for the same tuning adjustment of the circuit 34, the resulting undulations of positive polarity will be of less amplitude than the undulation 49. This is because of the fact that the shock excitation effects of the leading and trailing edges of pulses of width differing from pulse 21a neutralize each other more or less depending upon the width difference of the pulse. Thus, for pulse 22a an undulation 50 of amplitude less than amplitude 49 is produced and for pulse 23a a still smaller undulation 51 is produced.

The bias as determined by the adjustment of potentiometer 45 on the grid 44 of clipper tube 43 is selected to provide a clipping level 52 for clipping the peaks of the undulations 49. The tube 43 may also have an amplifying characteristic and if desired additional amplifiers may be provided to increase the amplitude of the resulting peak portion obtained from undulations 49. Pulse energy corresponding to the peak portions of undulations 49 is shown at 53 in graph F.

Referring back to Fig. 2, the pulse output energy of selector 26 is applied to both the demodulator 27 and the resonant circuit 13. If the receiver 5 is used only for selective reception of signals, the pulse width selector may be adjusted to select other channels of signals according to their pulse width characteristics. This is accomplished by tuning the circuit 34 to a frequency, the period of which is twice the duration of the desired pulse width.

Referring now to graph G, Fig. 3, assume that the pulses 53 of graph F, which represents the pulse output of selector 26, are applied to resonant circuit 13. The circuit 13 will be controlled by the pulses 53 to produce an oscillatory wave 54 which has a frequency corresponding to the repetition rate of the pulses 53. This resonant circuit 13 must, of course, be sufficiently sharp so as to eliminate the effect of the modulation on the received pulses and thus prevent the effect of cross-talk on the ultimate transmitted pulses. The wave 54 is frequency divided at 14 as indicated by the wave 55, which, in turn, is shifted in phase as desired at 15 as indicated by wave 56. The phased wave 56 is then applied over switch connections 8, 16 to the modulator 9 whereby pulses are produced and modulated in time according to the signal received from microphone 10.

Figure 5:
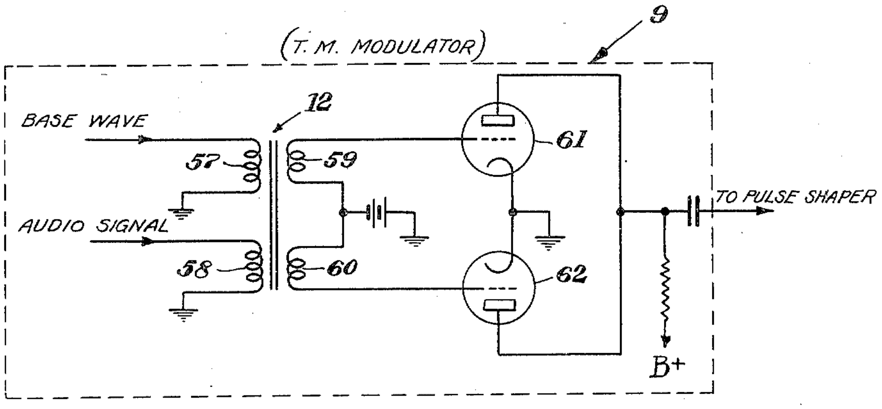
Fig. 5 is a schematic circuit diagram of a pulse time modulator.

Referring particularly to the circuit diagram of time modulator 9 in Fig. 5, the base wave 56 is applied to the primary 57 of input transformer 12 in parallel with the signal voltage from the microphone 10 which is applied to primary coil 58. The modulator circuit includes two secondary coils 59 and 60 coupled to the control grids of two vacuum tubes 61 and 62 in push-pull arrangement similar to a full wave rectifier. The modulator amplifies and, in effect, rectifies the wave 10 to produce a cusper wave 63, graph H, Fig. 3. The rectification of the wave 56 is shown to be symmetrical to the zero axis 64, graph G, although the rectification may be unsymmetrical if desired by providing an unbalanced bias for the grids of the tubes 61 and 62. The audio signal varies the relative relation between axis 64 and the wave 56 between maximum positive and negative modulating limits represented by levels 65 and 66. For these modulating limits, the cusper wave 63 is shifted in time position as indicated by curves 67 and 68. The cusper wave 63 is applied to pulse shaper 17 which includes a double clipper and amplifier arrangement of known character adapted to clip the wave 63 between levels 69 and 70 to produce an output pulse 22a. This output pulse is shown in graph D in its time relation with other pulses transmitted on the common carrier frequency. The U. H. F. modulator 18 may be arranged to provide a carrier frequency corresponding exactly to the carrier frequency received by receiver 5 for transmission of the output pulses of shaper 17.

For a further discussion of T. M. modulators of the character shown in Fig. 5, reference may be had to our copending application Serial No. 455,897, filed August 24, 1942, now Patent No. 2,416,329 issued February 25, 1947, which is also assigned to the Federal Telephone and Radio Corporation.

While the U. H. F. modulator 18 and amplifier 19 may be arranged for transmitting a given carrier frequency, preferably the carrier frequency used is obtained from the signal pulses received from the master station. The method of obtaining the frequency component of the received signals is illustrated in the embodiment shown in Fig. 6.

Figure 6:
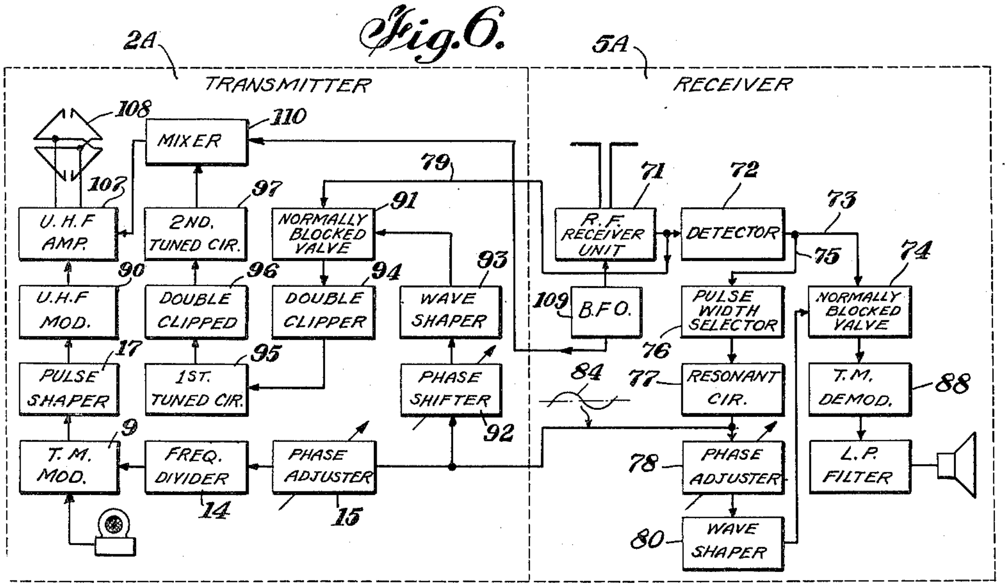
Fig. 6 is a block diagram of a further transmitter-receiver embodiment of the invention.

In Fig. 6 the receiver 5A includes an U. H. F. receiver unit 71 and detector 72 of known character for receiving the common carrier frequency modulated with signals from the master and other broadcasting stations. The signal pulses after detection are applied over connection 73 to a normally blocked valve 74 and over connection 75 to a pulse width selector 76. The selector 76 may be of the same character described in connection with selector 26, Figs. 2 and 4, for selecting the pulses of a channel according to their characteristic width. The output pulse energy of selector 76 is applied to a resonant circuit 77 to produce an oscillatory wave similar to the wave 55 produced by resonant circuit 13 of Fig. 2. The oscillatory wave is applied to phase adjuster 78. Adjuster 78 varies the phase as desired for the production of a de-blocking wave for valve 74, the output of adjuster 78 being applied to wave shaper 80 for suitable shaping.

Figure 7:
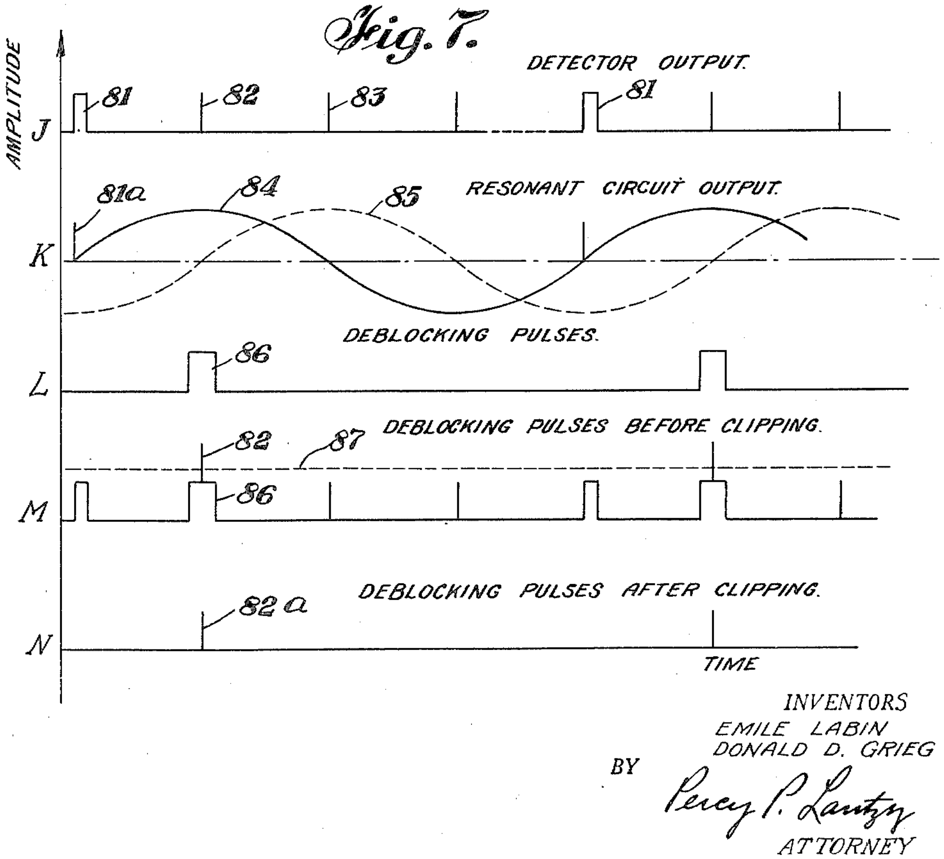
Figs. 7 and 8 are graphical illustrations useful in explaining the operation of the embodiment of Fig. 6.

To illustrate the foregoing operation, we have shown a series of graphs in Fig. 7. Graph J represents an output wave of detector 72 where pulses 81 are the signal pulses from the master station and pulses 82, 83 etc. are pulses of the transmitter 2A and other transmitters of the system, such as transmitter 3, for example. The pulses 82 and 83 are shown to be of the same width while pulses 81 are of a different width so that selector 76 will segregate the pulses 81 to the exclusion of the other signal pulses received. The pulse output of selector 76 is indicated at 81a, graph K and the output wave of resonant circuit 77 is indicated at 84. The wave 84 is shifted in phase by adjuster 78 to the phase condition indicated by wave 85. The wave 85 is applied to shaper 80 to produce the wave of graph L having discrete de-blocking pulse portions 86. The pulses 86 when applied to the valve 74 coincide with pulses 82 to produce combined energy sufficient to overcome the bias of valve 74 represented by level 87 whereby pulse energy 82a is passed by the valve 74 to the demodulator 88. The demodulator 88 functions to translate the time modulation of the pulses to amplitude modulated energy which in the present example, serves to monitor the signals transmitted by the transmitter 2A. It will be understood, of course, that the phase adjuster 78 may be changed to de-block the pulses of any desired channel received on the common carrier frequency at 71. In addition the de-blocking phase may be adjusted so as to block the receiver during the time of transmission at 2A and thus prevent overloading and paralysis of the receiver if required. It will also be clear that the receiver circuit 5A may be used independently of the transmitter circuit 2A.

The wave output 84 of circuit 77 may be differently phased by adjuster 15 for provision of a base wave for time modulator 9 similarly as described in Fig. 2. The wave 84 is, of course, frequency divided at 14, Fig. 6, as previously described and the output of modulator 9 is shaped at 17 to produce pulses of the desired shape which are applied to U. H. F. modulator 90 for modulation of a carrier of the desired frequency.

Figure 8:
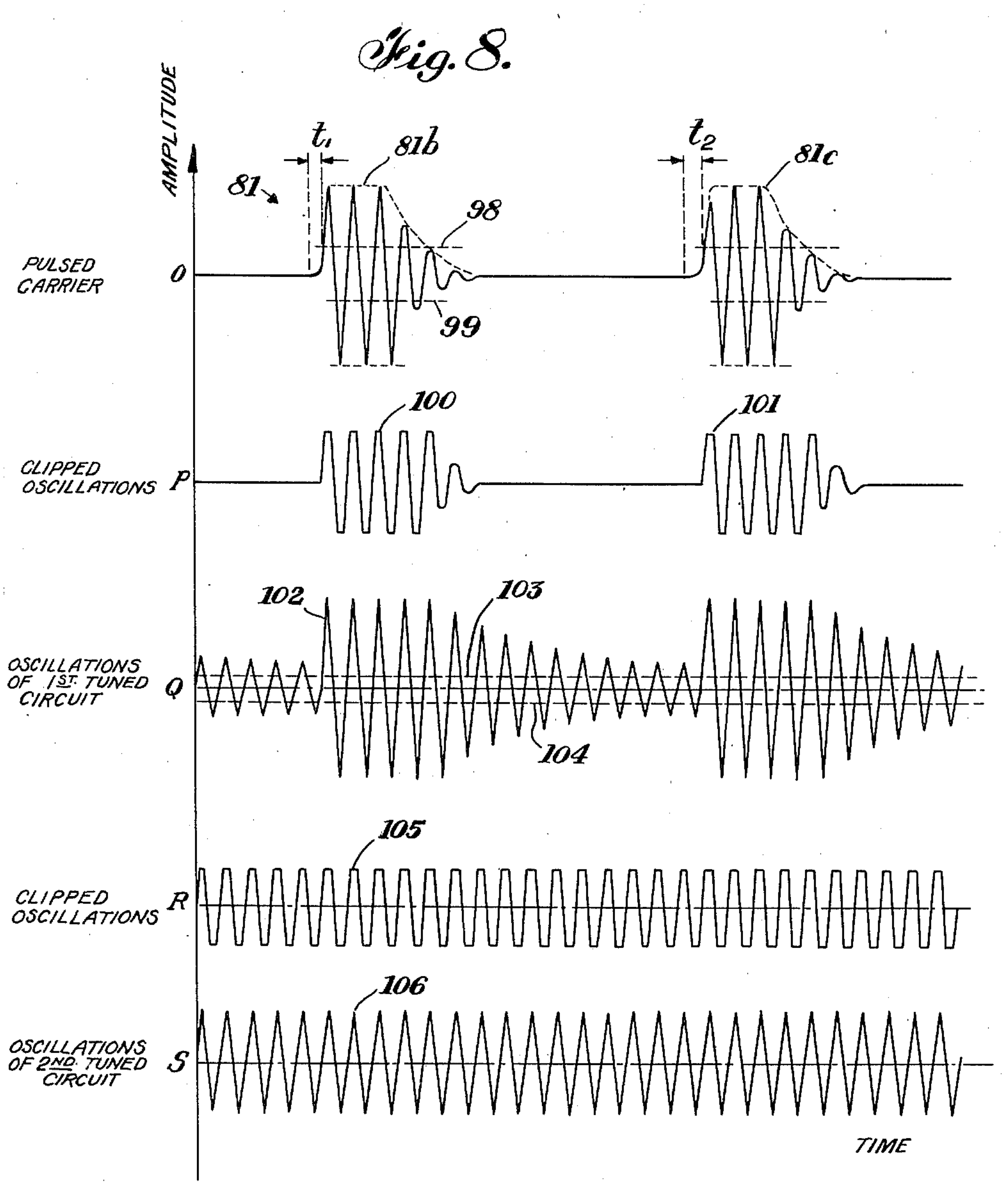

In order to obtain the frequency component of the pulses 81, for example, the R. F. carrier output of amplifier 71 is applied over 79 to a normally blocked valve 91 to which is also applied a de-blocking wave obtained from wave 84, suitably phased at 92 and shaped at 93. Since it is to control the carrier frequency from the master station, the phase adjuster 92 is adjusted to time the de-blocking pulses for coincidence with pulses 81. Thus, the carrier oscillations defining the envelope of pulses 81 are passed by the valve 91 to a double clipper 94. Referring to Fig. 8, the graphs thereof illustrate the operating steps of the double clippers tuned circuits of blocks 94, 95, 96 and 97 of Fig. 6, whereby the carrier component of the signal pulses 81 is obtained. Graph O represents a pulsed carrier, it being understood that in actual practice the carrier employed is of much higher frequency than that indicated in comparison with the pulse envelopes 81 defined thereby.

The leading edge of pulse envelope 81*b* is shown to be time displaced an amount $t_1$ while pulse envelope 81*c* is displaced an amount $t_2$, according to signal intelligence transmitted from the master station. While these displacements for two succeeding pulses are shown to be in the same time direction, it will be clear that the time displacement may be in opposite directions, as in the case of push-pull time modulation. It will also be clear that certain of the pulses may be given a constant timing while other pulses are displaced in time.

When the pulsed carrier is applied to the double clipper 94, the carrier is limited between voltage levels 98 and 99 thereby producing rectangular waves of a duration corresponding to the undulations of the carrier oscillations as illustrated at 100 and 101, graph P. When the wave output of clipper 94 is applied to circuit 95, it produces an oscillation in the output of the circuit 95 similarly as illustrated at 102, graph Q. While the oscillations 102 are purposely exaggerated to better illustrate the translation, it will be clear that the initial oscillations set up in the circuit by the initial undulations of the wave segments of pulse envelopes 81*b*, 81*c* will be of a given amplitude greater than those following. This is because the leading and trailing edges of the first undulations defining the envelope wave are the steepest, the steepness of the leading and trailing edges of the succeeding damped undulations thereof decreasing according to the decay that defines the trailing portion of the envelopes. While the oscillations 102 are shown to continue throughout the interval between succeeding pulse envelopes, the interval may be such, and the characteristics of the tuned circuits may be of sufficiently low "Q," as to cause the oscillations to die out between pulses. In such case a repeated processing, that is, a further double clipping and filtering operation, may be employed to obtain a continuous oscillation.

The time displacement of pulses 81*b*, 81*c* due to modulation will, of course, alter slightly the amplitude of the undulations 102 according to the degree of such time displacement. The pulse displacement will not vary the amplitude of the oscillations due to the high effective "Q" obtained by means of the combination double clipping and filtering operations.

Assuming that the wave 102 is applied to a second gate double clipper 96 whereby it is clipped between limits 103 and 104, a rectangular wave 105, graph R, will be produced. The frequency of this wave is substantially constant, but here again, the leading and trailing edges vary in steepness according to the variations in amplitude of oscillations 102. By applying the wave 105 to the tuned circuit 97 or to a multi-vibrator and then a tuned circuit, the variations in steepness of the leading and trailing edges are largely overcome thereby resulting in a substantially true sinusoidal wave 106 of the desired frequency.

The sinusoidal wave 106 output of tuned circuits 97 is applied to amplifier 107 for modulation of signal pulses from modulator 90. The resulting signal modulated carrier is radiated from antenna 108, it is thus clear that by this circuit the frequency component of the pulse signal received from the master station is obtained and employed as the carrier frequency for the signal pulses produced by modulator 9.

It should be pointed out that the R. F. receiver unit 71 may comprise the usual circuits for translation of the received U. H. F. signals to an I. F. signal in order to obtain better selectivity and amplification. When this type of R. F. receiver is used the intermediate frequency after the processing of double clipping and filtering must be transposed back to the original U. H. F. frequency. This may be accomplished by the well known method of beating the receiver beat frequency oscillator 109 with the intermediate frequency. The beat frequency oscillator 109 and mixer 110 illustrated in figure are utilized for this purpose.

The same process for obtaining an effective high "Q" by successive double clipping and filtering may, of course, be utilized for the resonant circuits 13 and 77 of Figs. 2 and 6 respectively. In this manner cross-talk may be minimized, as indicated previously.

While we have shown and described various embodiments and applications of the invention, it will be understood that many other embodiments, variations and applications may be made without departing from the invention. It is to be understood, therefore, that the systems herein illustrated and described are to be regarded as illustrative of the invention only and not as restricting the scope of the invention as set forth.

We claim:

1. In a transmitter-receiver combination, means for receiving energy signal pulses on a given carrier frequency, means to discriminate between the widths of the pulses received in order to obtain pulse energy in synchronism with the timing of pulses of a given width, means for producing signal pulses of a width different from said given width and differently phased with respect to the occurrence timing of pulses of said given width, means for modulating the last mentioned signal pulses in accordance with the signal to be conveyed, and means transmitting the produced signal pulses on said given carrier frequency.

2. A combination according to claim 1 wherein the means for transmitting includes means for obtaining the frequency component of the received signal pulses and means for transmitting the signal pulses produced on the carrier frequency thus obtained.

3. A combination according to claim 1 wherein the means for transmitting includes a normally blocked valve to control passage of carrier signal energy received, means for producing a de-blocking wave for said valve from said pulse energy to control the opening of said valve in coincidence with the signal pulses of said given width, means for obtaining the carrier frequency component from the signal pulses passed by said valve, and means for transmitting the signal pulses produced on the carrier frequency thus obtained.

4. A plurality of broadcasting transmitters, one of said transmitters having means to transmit signal pulses of a given pulse width on a given carrier frequency, and each of the other of said transmitters having means to receive said transmitted pulses, means to discriminate in pulse width to obtain pulse energy synchronized with the received pulses of said given width, means to produce under control of said pulse energy a train of signal pulses of a width different from said given width and in different phase relation with respect to the occurrence timing of the pulses of said given width, means for modulating the last mentioned signal pulses in accordance with the signal to be conveyed, and means to transmit the pulses produced on said given carrier frequency.

5. A plurality of radio transmitters and receivers, one of said transmitters known as master transmitter being provided with means to transmit among others, on a given carrier frequency, reference energy pulses having a given average recurrence rate and a given width or duration, each of the other transmitting and receiving stations being provided with means to receive and select said master station transmitted pulses by width discrimination to obtain pulse energy synchronized with the master transmitter, means to provide under the control of said pulse energy a train of signal pulses of a different width and of different phase relation with respect to the occurrence timing of said reference pulses and using said reference pulses so obtained to select one train of pulses transmitted by another transmitter with a given phase relation with respect to the timing of the reference pulses transmitted by the master transmitter.

EMILE LABIN.
DONALD D. GRIEG.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,181,309 | Andrieu | Nov. 28, 1939 |
| 2,185,693 | Mertz | Jan. 2, 1940 |
| 2,189,267 | Kolozsy | Feb. 6, 1940 |
| 2,199,179 | Koch | Apr. 30, 1940 |
| 2,262,838 | Deloraine et al. | Nov. 18, 1941 |
| 2,411,547 | Labin et al. | Nov. 26, 1946 |
| 2,425,314 | Hansell | Aug. 12, 1947 |
| 2,425,315 | Atwood et al. | Aug. 12, 1947 |
| 2,425,316 | Dow | Aug. 12, 1947 |
| 2,429,613 | Deloraine et al. | Oct. 28, 1947 |